July 8, 1958 C. S. HORST 2,841,930
THREADING TOOL GRINDING FIXTURES
Filed Dec. 7, 1956
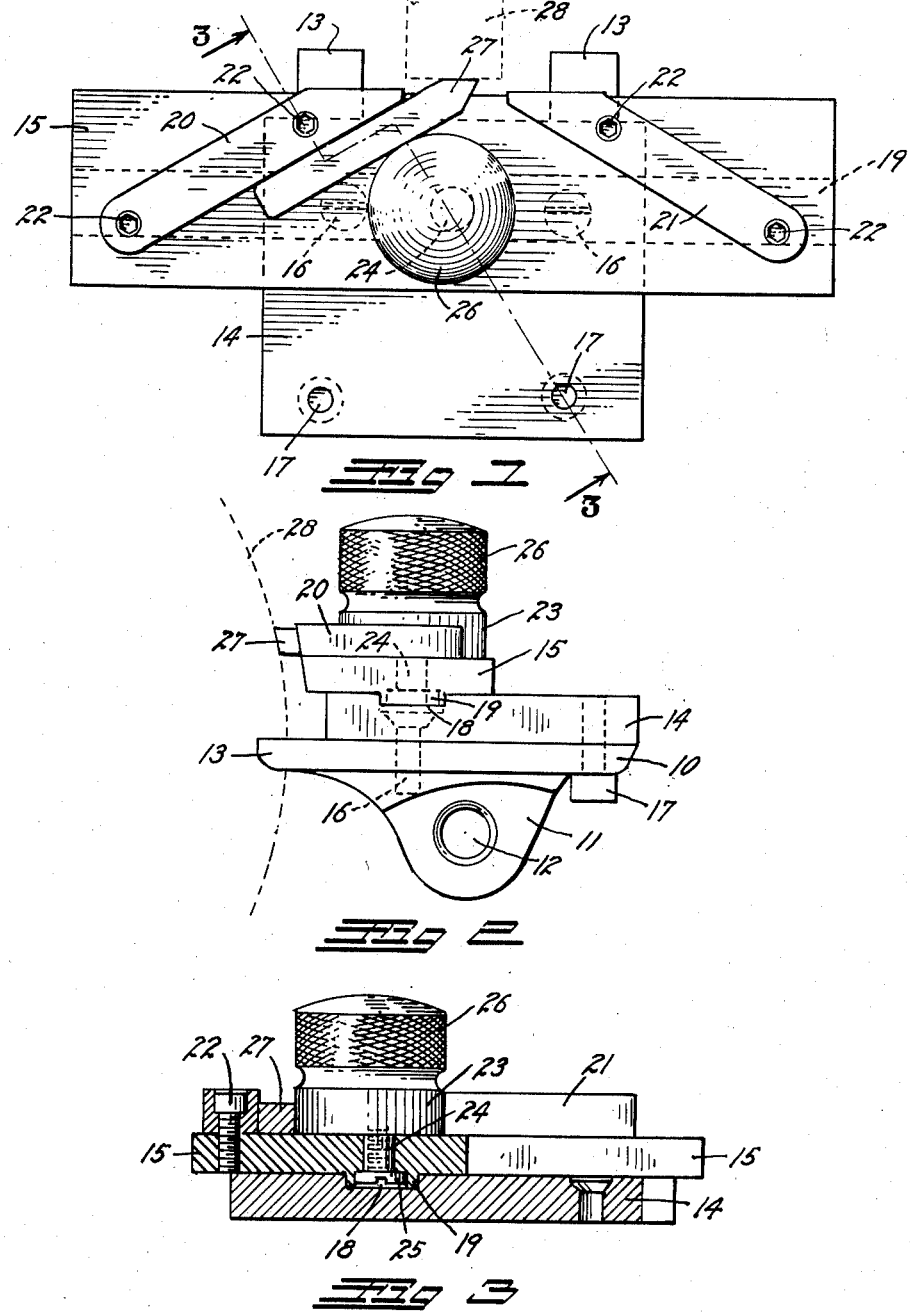
INVENTOR.
CONRAD S. HORST
BY
ATTORNEY

United States Patent Office 2,841,930
Patented July 8, 1958

2,841,930

THREADING TOOL GRINDING FIXTURES

Conrad S. Horst, Denver, Colo., assignor to William C. Horst and Robert E. Horst, both of Denver, Colo.

Application December 7, 1956, Serial No. 626,926

3 Claims. (Cl. 51—231)

This invention relates to a tool grinding fixture more particularly to a fixture for use in sharpening lathe thread cutting tools.

Thread cutting tools for use on lathes are usually ground by hand on a cut a try basis, that is, the tool is constantly compared with a 60° thread tool gauge while being ground until the proper edge and proper angle is attained. This is a time consuming operation and requires skillful manipulation to obtain the proper thread cutting point.

The principal object of this invention is to provide a simple fixture which can be applied to any conventional grinder tool rest and which can be used by even an unskilled operator to quickly and easily grind an accurate 60° thread cutting point upon a lathe thread cutting tool.

Another object of the invention is to provide means in a thread cutting tool fixture for instantly and firmly securing a cutting tool at the proper angle for grinding and for accurately grinding the tool across a grinding wheel parallel to the wheel axis.

A further object is to provide a grinding fixture in which a wheel dressing diamond may be quickly and securely mounted and which will accurately guide the diamond across the wheel to form a perfect cylindrical surface on the wheel.

Other objects and advantages reside in the detail construction of the invention, which is designed for simplicity, economy, and efficiency. These will become more apparent from the following description.

In the drawing:

Fig. 1 is a top view of the improved grinding fixture illustrating it mounted upon a conventional grinder tool rest;

Fig. 2 is a left end view of the fixture of Fig. 1; and

Fig. 3 is a diagonal cross section, taken on the line 3—3, Fig. 1, with the tool rest removed.

In the drawing a conventional grinder tool rest of the "Delta" type is illustrated at 10. Such a rest is provided with a mounting ear 11 having a hole 12 for the passage of the grinder tool post and is also formed with tool supporting arms 13 adapted to extend upon opposite sides of a grinding wheel as indicated in broken line at 28. The tool rest is illustrated and described simply for the purpose of showing where and how the improved fixture is mounted on a grinder. The fixture could be applied to any of the various types of tool rests used in the art.

The improved fixture employs a substantially rectangular base plate 14 upon which an elongated rectangular slide plate 15 is slidably mounted. The base plate is provided with suitable screw openings for receiving cap screws by means of which it may be attached to any of the conventional tool rests. As illustrated, the base plate is provided with two forward countersunk screw holes for receiving two downwardly extending flat-head cap screws 16 which are threaded into the tool rest 10 and with two rear tapped screw holes for receiving two cap screws 17 which extend upwardly through the tool rest 10.

While the base plate 14 may have any desired size and thickness, a plate 2⅓" wide and 3" long and having a thickness of ⅜" has been found highly satisfactory. A longitudinally-extending slide groove 18 is formed in the top of the plate parallel to and relatively close to the front edge thereof. The groove usually employed has a width of ½" and a depth of ⅟₁₆". A longitudinally extending tongue 19 is formed on the bottom of the slide plate 15 which corresponds in size to, and slides in, the groove 18.

The slide plate may have any desired size and thickness. A plate 1½" wide and 6" long and having a thickness of ¼" has been found satisfactory. The groove 18 and the tongue 19 are so relatively positioned that the forward edge of the slide plate 18 will project forwardly from the forward edge of the base plate.

A left tool guide bar 20 and a right tool guide bar 21 are secured upon the upper surface of the slide plate 14 in any desired manner such as by means of countersunk "Allen" type attachment screws 22. The bar 20 is inclined forwardly and to the right at an angle of substantially 30° to the longitudinal axis of the slide plate and the bar 21 is similarly inclined forwardly and to the left at an angle of 30° to the longitudinal axis. The bars 20 and 21 terminate at the forward edge of the slide plate 15 and are beveled to correspond to the bevel of the forward edge of the latter.

The bars 20 and 21 may be of any suitable size and are beveled at their forward extremities to align with the forward edge of the slide plate 15. The forward extremities should be spaced apart sufficiently to allow the largest expected thread cutting tool, such as illustrated at 27, to extend forwardly between the bars when positioned against either of the bars.

A locking cam 23 is mounted on the slide plate at a point intermediate the two bars 20 and 21. The locking cam is formed with an eccentrically-positioned pivot stud 24 which extends downwardly into a pivot bore in the slide plate and which is secured in place in the bore by means of a terminal screw 25 which is threaded into the stud.

The head of the screw 25 is countersunk into the tongue 19 so as not to project below the latter. The locking cam is provided with a knurled head portion 26 which may be readily gripped between the thumb and finger.

The cam may be of any suitable size and have any desired degree of eccentricity. It should, however, be such as will allow the cam to swing within ⅜" of either bar 20 or 21 and away from the bars a distance in excess of ⅜". A cam of a diameter of 1⅛" with an eccentricity of ⁵⁄₃₂" has been found to be satisfactory.

Let us assume that the improved fixture is in place on the tool rest of a conventional grinder and that it is desired to grind the point of the tool 27 to an accurate 60° point. The tool is placed against one of the guide bars, for instance the left guide bar 20, so that its pointed extremity projects forwardly from the front edge of the slide plate 15, as illustrated in Fig. 1.

The knurled head 26 is then rotated to cause the eccentric cam 23 to rotate into frictional engagement with the tool so as to clamp the latter rigidly against the guide bar 20. The tool rest is now adjusted to bring the tool into contact with the grinding wheel and the entire slide plate is slid back and forth to cause the tool to travel across the surface of the wheel to grind an accurate cutting edge on the left side of the point. The tool is then released by rotating the cam 23 and is replaced against the guide bar 21 where it is securely clamped by the cam 23. The slide plate is now slid back and forth to grind an accurate cutting edge on the right side of the point to complete the sharpening operation.

To insure accuracy, it is preferred to clamp a conventional diamond-pointed wheel dresser against one of the guide bars so that it will project forwardly from the slide plate. The wheel dresser can then be moved accurately across the wheel to shape the wheel in accurate alignment with the slide plate axis before the sharpening operation is commenced. As illustrated, the improved fixture will handle threading tools varying from 3/16" to 3/8" square.

While a specific form of the improvement has been described and illustrated herein, it is desired to be understood that the same may be varied within the scope of the appended claims, without departing from the spirit of the invention.

Having thus described the invention, what is claimed and desired secured by Letters Patent is:

1. A device for supporting a pointed tool on a tool rest and in grinding relation with a grinding wheel comprising: a base plate; means for securing said base plate in a substantially horizontal position on said tool rest; a slide plate, having a substantially horizontal upper surface, resting upon said base plate; guide means guiding said slide plate transversally of said base plate and parallel to the axis of said wheel; two oppositely inclined guide bars mounted upon the horizontal upper surface of said slide plate and extending rearwardly from a spaced-apart position at the forward edge of said slide plate at an obtuse angle to each other to outline a triangular area on the upper surface of said plate; and a rotatable eccentric member mounted on a vertical axis on said slide plate intermediate said guide bars, the eccentricity of said eccentric member being sufficient to clamp the tool horizontally outward against either guide bar.

2. A device for supporting a pointed tool on a tool rest and in grinding relation with a grinding wheel comprising: a base plate; means for arranging for transverse guided movement on said base plate on said tool rest; a slide plate resting upon said base plate; a left tool guide bar secured upon the upper surface of said slide plate and extending forwardly and to the right at an angle of substantially 30° to the longitudinal axis of said slide plate; a right tool guide bar similarly secured to said slide plate and extending forwardly and to the left at an angle of substantially 30° to the longitudinal axis of said slide plate, said bars terminating at the forward edge of said slide plate in spaced-apart relation; and a rotatable eccentric member mounted on a vertical axis on said slide bar intermediate said guide bars, so that when rotated in one direction, it will approach said left guide bar, and when rotated in the other direction it will approach the right guide bar so that the tool may be clamped by said eccentric member against either desired guide bar.

3. A device for supporting a pointed tool on a tool rest as described in claim 2 having a finger knob formed on and projecting upwardly from said eccentric member to provide manual means for sliding said slide plate and for rotating said eccentric member, and having a pivot stud extending downwardly into said slide plate intermediate said two guide bars.

References Cited in the file of this patent
UNITED STATES PATENTS

| | | |
|---|---|---|
| 1,193,525 | Dosch et al. | Aug. 8, 1916 |
| 1,275,208 | Bockshe | Aug. 13, 1918 |
| 1,950,824 | Suter | Mar. 13, 1934 |
| 2,154,999 | Seybold | Apr. 18, 1939 |
| 2,324,608 | Walling | July 20, 1943 |